(12) United States Patent
Shiner

(10) Patent No.: US 8,562,253 B2
(45) Date of Patent: Oct. 22, 2013

(54) METHOD AND APPARATUS FOR MOUNTING AND PROTECTION OF COMMUNICATION EQUIPMENT IN UNDERGROUND MINE

(76) Inventor: Rickey V. Shiner, Price, UT (US)

( * ) Notice: Subject to any disclaimer, the term of this patent is extended or adjusted under 35 U.S.C. 154(b) by 0 days.

(21) Appl. No.: 13/363,960

(22) Filed: Feb. 1, 2012

(65) Prior Publication Data
US 2012/0192412 A1 Aug. 2, 2012

Related U.S. Application Data

(60) Provisional application No. 61/438,393, filed on Feb. 1, 2011.

(51) Int. Cl.
*E02D 29/00* (2006.01)
(52) U.S. Cl.
USPC .............. 405/132; 405/151; 405/288; 249/10
(58) Field of Classification Search
USPC ............ 405/293.3, 291, 132, 288, 290; 411/78–79; 29/592.1, 832, 825, 739; 454/169–171; 361/683–687; 249/10–12
See application file for complete search history.

(56) References Cited

U.S. PATENT DOCUMENTS

| | | | | | |
|---|---|---|---|---|---|
| 3,453,497 | A | * | 7/1969 | Oskar et al. | 361/829 |
| 4,030,308 | A | * | 6/1977 | Dudley et al. | 405/299 |
| 4,143,991 | A | * | 3/1979 | Stafford | 405/291 |
| 4,342,527 | A | * | 8/1982 | White | 405/259.3 |
| 4,441,838 | A | * | 4/1984 | Cossart | 405/150.1 |
| 4,710,064 | A | * | 12/1987 | Stafford et al. | 405/290 |
| 6,218,615 | B1 | * | 4/2001 | Canonico | 174/50 |
| 6,334,738 | B1 | * | 1/2002 | Juracko | 405/132 |
| 2007/0109736 | A1 | * | 5/2007 | Coglitore | 361/683 |
| 2012/0192412 | A1 | * | 8/2012 | Shiner | 29/825 |

* cited by examiner

*Primary Examiner* — Minh Trinh
(74) *Attorney, Agent, or Firm* — Morriss O'Bryant Compagni, PC

(57) ABSTRACT

An apparatus for supporting communication equipment in an underground mine includes a pair of vertically extending laterally spaced and substantially parallel elongate members, a pair of horizontally extending members, each depending from and extending outwardly from proximate a lower end of a respective elongate member a distance approximately equal to a thickness of a power supply, an upper shield member attached to and extending outwardly from proximate an upper end of the pair of elongate members in the same direction as the pair of horizontally extending members, extending a distance approximately equal to a depth of power supply and having a width approximately equal to a width of the power supply, and a flexible sheet of material disposed over the pair of elongate members from below the upper shield to above the pair of horizontally extending members that is held in place by the communication node.

9 Claims, 6 Drawing Sheets

METHOD AND APPARATUS FOR MOUNTING AND PROTECTION OF COMMUNICATION EQUIPMENT IN UNDERGROUND MINE

CROSS-REFERENCE TO RELATED APPLICATION

The present application claims priority to U.S. Provisional Patent Application Ser. No. 61/438,393 filed on Feb. 1, 2011, the entirety of which is incorporated by this reference.

FIELD OF THE INVENTION

This invention relates generally to methods and devices used in underground mine communications, and more specifically to a device for installation and protection of communication node equipment in an underground mine.

DESCRIPTION OF THE RELATED ART

Because of the continuing need to create and maintain communication links with those working in underground mine, various communication equipment has been designed and installed in such underground mine environments. Environmental conditions typically encountered in underground mines, however, are not particularly favorable to sensitive electronic equipment that can be damaged by water, dust and falling debris. Until now, such communications equipment, which may include a series of links or nodes and power supplies, in the form of battery packs, have been mounted along the walls and to the ceilings of underground mine passage ways using various informal methods, including hanging the equipment with wires that are tied to or hung from any available structure that may be found in the mine. As such, the communications equipment is generally exposed and susceptible to damage from water and falling debris.

Accordingly, there is a need in the art to provide an apparatus for mounting and protecting such equipment in an underground mine environment that protects the equipment and provides a relatively compact and lightweight mounting assembly.

SUMMARY OF THE INVENTION

Accordingly, a method and apparatus for supporting communication equipment in an underground mine are provided. A communications system rack is provided that includes a pair of vertical rack members that are laterally spaced and substantially parallel to one another. A pair of horizontally extending support members each depend and outwardly extending from a lower end of a respective rack member a distance approximately equal to a thickness of a communication node. An upper shield member is attached to and extends outwardly from an upper end of the pair of rack members in the same direction as the pair of support members. The support members extend a distance at least equal to a depth of a power supply and have a width at least equal to a width of the power supply. A flexible sheet of material is disposed over the pair of rack members from below the upper shield to above the pair of support members, the flexible sheet of material has a width that is approximately equal to a width of the power supply.

In one embodiment, a communications node is fixedly attached to the pair of rack members with the flexible sheet of material disposed therein between to secure the communications node to the pair of rack members and the flexible sheet of material between the communications node and the pair of rack members. A power supply is removably attached to the pair of rack members and rests on the pair of support members. The power supply is electronically connected to the communications node.

The communications system rack is hung in an underground mine with the upper shield member positioned above the communications node and the power supply.

In another embodiment, the pair of rack members have a C-shaped cross-section. A plurality of substantially square fasteners are inserted within the elongate members and a corresponding plurality of externally threaded fasteners are inserted through a portion of the communication node, through the flexible sheet of material and into a square fastener.

In still another embodiment, a pair of L-shaped brackets are rigidly fastened to and between the respective lower ends of the elongate members and a respective one of the horizontally extending members to rigidly secure the pair of horizontally extending members in a substantially perpendicular arrangement relative to the pair of vertically extending members.

In yet another embodiment, the upper shield member has an L-shaped cross-section with a back wall portion fixedly attached to and between the pair of horizontally extending members and an overhang portion integrally formed with and depending from said back wall portion.

In still another embodiment, the upper shield member has a width that is greater than a width of the communication node and a front to back length that is greater than a front to back length of the communication node.

In yet another embodiment, the upper shield member is formed from a substantially rectangular sheet of metal having a bend proximate one end thereof to form the back wall portion, where an acute angle is formed between the back wall portion and the overhang portion.

In another embodiment, the flexible sheet of material is attached so that a portion thereof is disposed over the back wall portion of the shield in an overlapping manner to prevent water from passing in front of the flexible sheet of material from the back wall portion.

In still another embodiment, the flexible sheet of material is formed from MSHA approved brattice.

The foregoing advantages and characterizing features will become apparent from the following description of certain illustrative embodiments of the invention. The above-described features and advantages of the present invention, as well as additional features and advantages, will be set forth or will become more fully apparent in the detailed description that follows and in the appended claims. The novel features which are considered characteristic of this invention are set forth in the attached claims. Furthermore, the features and advantages of the present invention may be learned by the practice of the invention, or will be obvious to one skilled in the art from the description, as set forth hereinafter.

BRIEF DESCRIPTION OF THE DRAWINGS

It will be appreciated by those of ordinary skill in the art that the various drawings are for illustrative purposes only. The nature of the present invention, as well as other embodiments of the present invention, may be more clearly understood by reference to the following detailed description of the invention, to the appended claims, and to the several drawings. Elements and acts in the figures are illustrated for simplicity and have not necessarily been rendered according to any particular sequence or embodiment.

DETAILED DESCRIPTION OF THE ILLUSTRATED EMBODIMENTS

Figure 1:
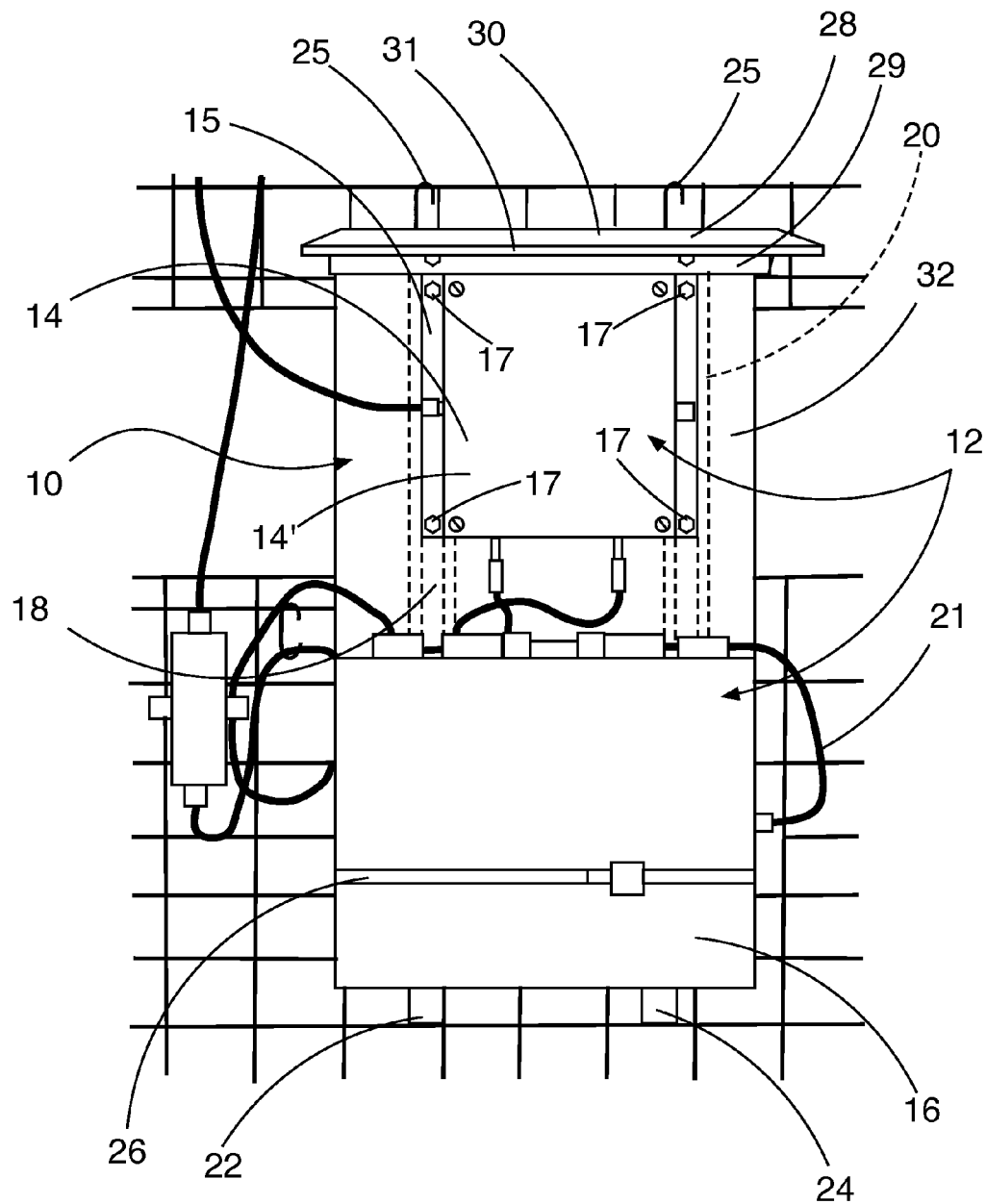
FIG. 1 is a front view of a communications equipment mounting rack and associated communications equipment in accordance with the principles of the present invention.

The present invention relates to systems for installation and protection of communication node equipment in an underground mine. It will be appreciated by those skilled in the art that the embodiments herein described, while illustrating certain embodiments, are not intended to so limit the invention or the scope of the appended claims. Those skilled in the art will also understand that various combinations or modifications of the embodiments presented herein can be made without departing from the scope of the invention. All such alternate embodiments are within the scope of the present invention.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. It is noted that the inventor can be his own lexicographer. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. §112, ¶ 6. Thus, the use of the words "function," "means" or "step" in the Detailed Description of the Invention or claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the inventions, the claims will specifically and expressly state the exact phrases "means for" or "step for" and the specific function (e.g., "means for filtering"), without also reciting in such phrases any structure, material or act in support of the function. Thus, even when the claims recite a "means for . . . " or "step for . . . " if the claims also recite any structure, material or acts in support of that means or step, or that perform the recited function, then it is the clear intention of the inventor not to invoke the provisions of 35 U.S.C. §112, ¶ 6. Moreover, even if the provisions of 35 U.S.C. §112, ¶ 6 are invoked to define the claimed inventions, it is intended that the inventions not be limited only to the specific structure, material or acts that are described in the illustrated embodiments, but in addition, include any and all structures, materials or acts that perform the claimed function as described in alternative embodiments or forms of the invention, or that are well known present or later-developed, equivalent structures, material or acts for performing the claimed function.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Various aspects of the present invention may be described in terms of functional block components and various processing steps. Such functional blocks may be realized by any number of hardware or software components configured to perform the specified functions and achieve the various results.

As shown in FIG. 1, a portable rack system, generally indicated at 10, to which mounting and installation of communication node equipment, generally indicated at 12, has been mounted and installed. In this embodiment, a wireless mesh communication node 14 is attached to the rack system 10 at an upper portion thereof with a corresponding backup power supply 16 mounted to the lower portion of the rack system 10. The rack system 10 is comprised of a pair of laterally spaced and vertically oriented elongate rack members 18 and 20 that extend the length of the rack system 10. The spacing between the rack members corresponds to mounting holes provided in the back mounting plate 15 of the node 14. The node 14 is thus attached with fasteners 17 to the rack members 18 and 20 through the back mounting plate 15 thereof.

To the lower end of each rack member 18 and 20, horizontally oriented mounted rack members 22 and 24 are mounted to the a respective rack member 18 and 20 that outwardly extend from the rack members 18 and 20 to provide lower support structures upon which the power supply 16 can rest and be retained relative thereto. In order to hold and secure the power supply 16 to the rack 10, a strap 26 is removably secured and positioned around the power supply 16 and behind the rigid rack members 18 and 20 of the rack 10. In the event that the power supply 16, which is in the form of a battery pack, needs replacement or repair, the strap 26 can be removed so that a repaired or replacement battery pack can be remounted to the rack 10 with the strap 26 reattached around the power supply 16 as previously described.

At the upper ends of each rack member 18 and 20 is rigidly and fixedly attached an L-shaped or plate 28. The plate 28 has a back portion 29 that is mounted to the upper ends of the rack members 18 and 20 and a laterally extending overhead portion 30 that forms a rigid shield over the communication equipment. The overhead portion 30 is slightly downwardly angled relative to the rack members 18 and 20 so that any water or debris that may fall on the top surface of the overhead portion 30 will tend to flow and/or move toward and drip or fall from the front edge 31 of the overhead portion 30. The overhead portion 30 is approximately as wide as the power supply 16 and thus wider than the node 14 and extends from the rack members 18 and 20 at least a distance equal to the depth of the power supply 16. While the power supply 16 is typically provided in a water tight case 19, the communication node 14 is potentially subject to failure if exposed to water that can seep through seams in the node housing 14' and cause internal circuitry therein to fail. The overhead portion 30 is thus configured to be wider and deeper than the communication node 14 so as protect the communication node 14 from water exposure and damage. The overhead portion 30 is also wide enough and deep enough and formed from a metal sheet so as to provide protection of both the communication node 14 and the power supply 16 from falling debris that could otherwise damage one or both. Also, by maintaining both the communications node 14 and the power supply 16 on a single rack system 10 in relatively close proximity, it is less likely that power from the power supply 16 will be dislodged from between the communications node 14 and the power supply 16 since the connecting cable 21 is maintained with some slack and protected from being pulled from either device, as could be the case when the communication node 14 and battery supply 16 are separately mounted relative to the wire mesh grid 23 in an exposed manner as was previously the common practice. Because the power supply 16 is typically provided in an impact resistant case that is larger than the communications node, positioning the power supply below the communications node 14, with the communications node also protected by the overhang portion of an upper shield 28, the communications node is further protected from external impact from other mining equipment that could damage the communications node 14.

Interposed between the rack members 18 and 20 and the communication node equipment 12 is an elongate sheet of MSHA approved brattice 32 that is accepted for use in underground mines. This material, which is commonly sold under the name VENTATEX and comes in various colors including clear and with various specifications, is fire proof and waterproof. In this particular application, the most important property of the brattice material is its impermeability to water and dust to keep water and dust away from the electronic components housed within the communication node 14 of the communications equipment 12. The sheet of brattice 32 is approximately the width or slightly smaller than the width of the L-shaped plate 28 and extends from the back wall 29 of the plate 28 to the lower ends of the rack members 18 and 20.

Accordingly, the rack 10 and associated communications equipment 12 can be attached to a wall or other support structure, such as the wire mesh grid 23 as shown, by using wire hooks 25 coupled proximate to the top of each of the rack members 18 and 20 to allow ease of placement, removal and replacement of the rack system 10 and communication equipment 12 within the mine. Any water or dust that may emanate from the mine wall there behind or from the mine ceiling, is not allowed to come into contact with the communication equipment 12 since it will be repelled by the back of the brattice 32 and the overhead plate 28.

Figure 2:
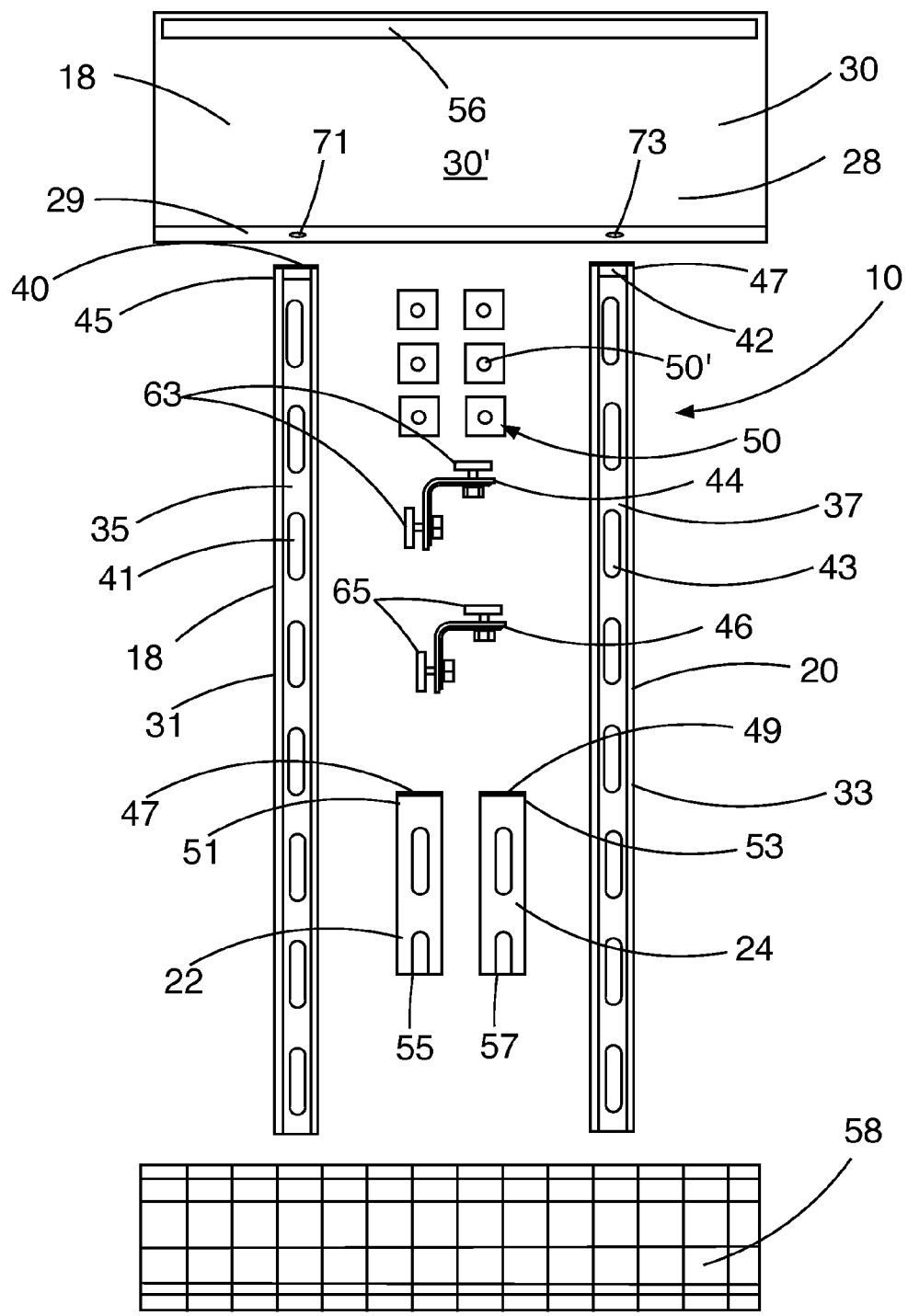
FIG. 2 is a front view of the various components of the communications equipment mounting rack of FIG. 1 in an unassembled form.

As further illustrated in FIG. 2, the rack system 10 according to the principles of the present invention is comprised of a pair of elongate rack members 18 and 20. The elongate rack members 18 and 20 have a C-shaped cross-section that forms a channel along the entire length of one side 31 and 33 thereof. The back walls 25 and 37 of each elongate rack member 18 and 20 are each provided with a plurality of equally spaced, elongate openings 41 and 43 that can be used to secure the rack system 10 to other equipment or structures found within an underground mine. The upper ends 45 and 47 of each elongate rack member 18 and 20 are provided with end caps 40 and 42 that are inserted into the upper ends of each elongate rack member 18 and 20, respectively. A pair of rigid lower rack members 22 and 24 is also provided that are configured to be mounted to the bottom ends or the elongate rack members 18 and 20, respectively. The lower rack members 22 and 24 are formed from the same C-shaped material as the elongate rack members 18 and 20. These members 22 and 24 are cut so that they will have a length sufficient to support a bottom of the power supply 16 shown in FIG. 1 and thus may be approximately equal in length to a depth of the power supply 16. End caps 47 and 49 are provided on each of the exposed ends 51 and 53 of the support members 22 and 24 to prevent sharp metal ends of the support members 22 and 24 from being exposed. The opposite ends 55 and 57 are configured to be attached to the elongate rack members 18 and 20. A pair of L-shaped mounting brackets 44 and 46 are configured to mount to the lower ends of each elongate rack member 18 and 20 and to the mounting ends 55 and 57 of each support member 22 and 24. Each L-shaped mounting bracket 44 and 46 is provided with fasteners 63 and 65 configured to mate with the C-shaped channels 59 and 61 of the rack members 18 and 20 and the support members 22 and 24 and thus to fixedly and rigidly secure the brackets 44 and 46 and attached support members 22 and 24 to a respective rack member 18 and 20 at a desired location. That is, in a loosened state, the fasteners 62 and 65 can slide within the C-shaped channels 59 and 61 until the desired position of the L-shaped brackets 44 and 46 is reached, upon which tightening of one set of the fasteners 63 and 65 will retain the L-shaped brackets 44 and 46 to the rack members 18 and 20.

A plurality of square-shaped, internally threaded, fasteners 50 are used to attach the communication node 14 and the overhead plate 28 to the rack members. The back wall 29 of the plate 28 is provided with holes 71 and 73 that are spaced a distance apart approximately equal to spacing between the fasteners 17 used to rigidly and fixedly secure the back plate 15 of the communication node 14 to the rack members 18 and 20 illustrated in FIG. 1. These fasteners 50 are configured to slide within the C-shaped channels 59 and 61 of the rack members 18 and 20 and can be positioned at any required position. Each fastener 50 has a width that will slide within the C-shaped channels 59 and 61 but that prevents rotation of the fastener 50 within a respective channel 59 and 61 as a corresponding bolt is threaded into the fastener 50. Thus, each fastener 50 is provided with an internally threaded aperture 50' for receiving a bolt 69. This allows at least the communication node 14 of the communications equipment 12 to be mounted to the rack members 18 and 20.

For mounting to the top of the elongate rack members 18 and 20, an L-shaped plate 28 is provided. The plate 28 includes a mounting portion 29 that extends the length of the plate 28 and an overhead or cover portion 30 that is cantilevered relative tot eh mounting portion 29 and is configured to extend over the communication equipment when mounted to the rack members 18 and 20. The plate 28 is actually shown with the top side 30' being visible and would be flipped in order to be mounted to the rack members 18 and 20. A reflective strip 56 is provided along the leading edge of the plate 28 so as to provide a visible indicator for the communication equipment to mining personnel when a light, such as a light typically located on the hard hat of the personnel is directed toward the communication equipment. The mounting portion 29 is provided with a pair of holes 71 and 73 through which bolts can be inserted and threaded into a pair of fasteners 50 positioned proximate a top end of the members 18 and 20. A sheet of brattice 58 is also provided for being mounted to the front sides of the rack members 18 and 20 and extending from the bottom of the cover portion 30 of the plate to the bottom of the mounting members 18 and 20. The brattice 58 provides a water and dust barrier behind the communication equipment 12 and from the cover portion 30 to proximate the support members 22 and 24 when attached to the rack members 18 and 20 proximate the lower ends of the rack members 18 and 20.

Figure 3:
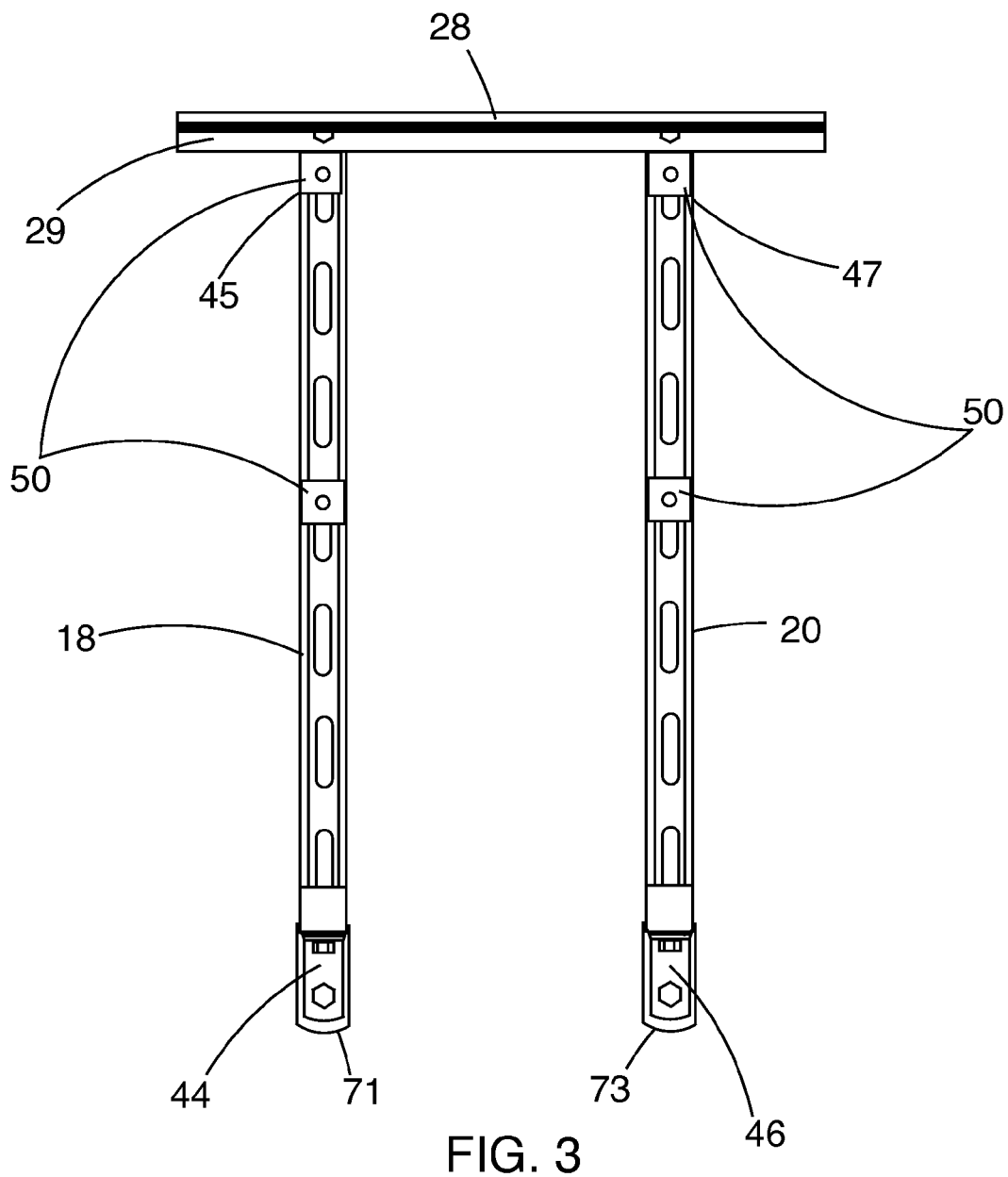
FIG. 3 is a front view of a communications equipment mounting rack in a partially assembled form in accordance with the principles of the present invention.

As shown in FIG. 3, the L-shaped brackets 44 and 46 are mounted proximate to the lower ends 71 and 73 of the of the rack members 18 and 20, respectively. Square fasteners 50 are provided toward the upper ends 45 and 47 of the rack members 18 and 20 for attaching the communication node (not shown) to the rack members 18 and 20. The plate 28 is mounted to the upper ends of the elongate members 18 and 20 with square fasteners 50, not visible and associated bolts 69 that extend through the holes in the back wall portion 29 of the plate 28. Attachment of the plate 28 and the communications node 14 provide lateral structural strength to the rack 10 of the present invention without the need for lateral cross-members.

Figure 4:
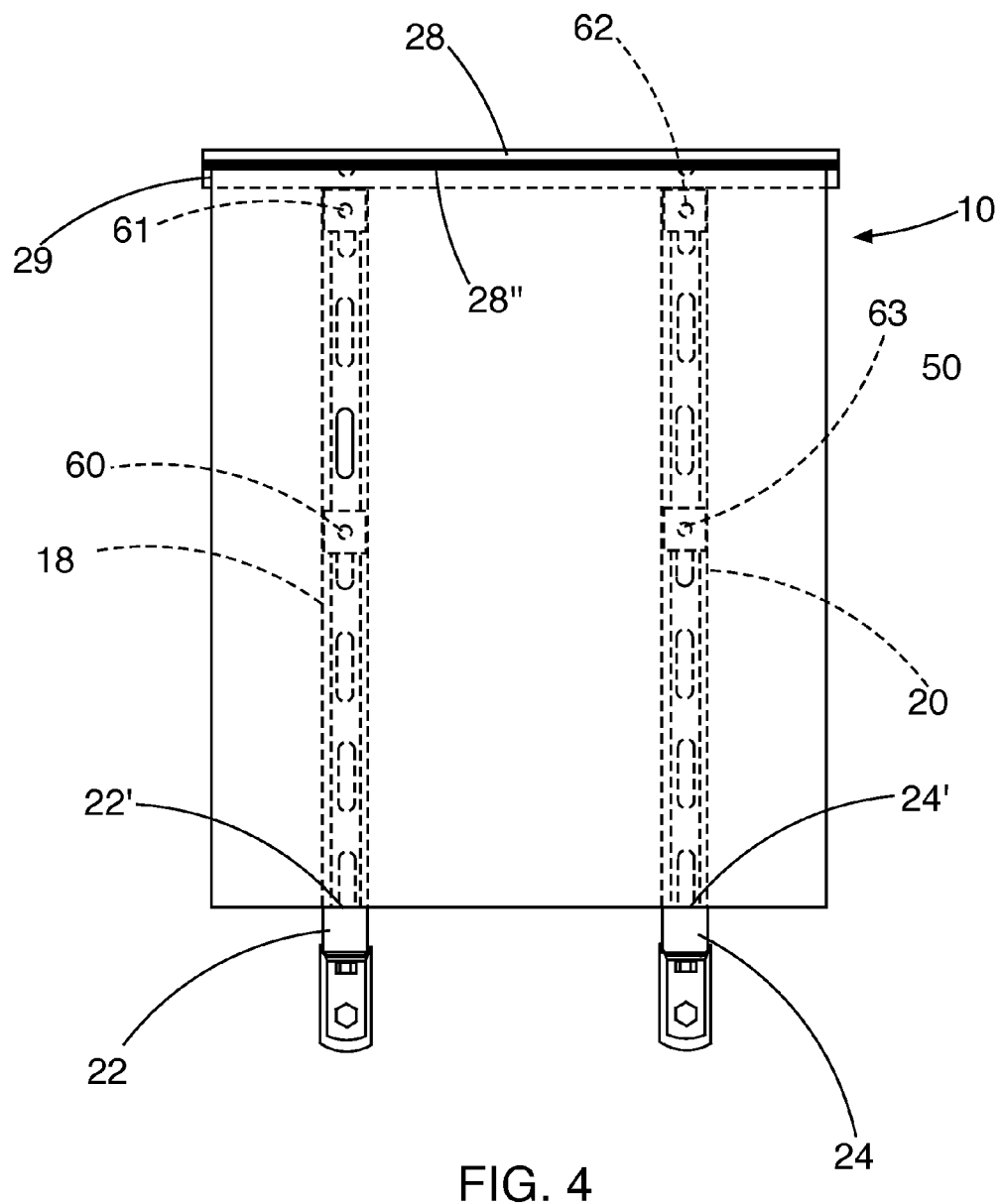
FIG. 4 is a front view of a communications equipment mounting rack assembled in accordance with the principles of the present invention.

As further illustrated in FIG. 4, once the essential structural components of the rack 10 of the present invention are assembled, the sheet of brattice 28 is positioned over the front sides of the rack members 18 and 20 and the front side of the back wall portion 29 of the plate 28. The brattice 28 has a length so as to extend from a bottom surface 28" of the plate 28 to the top surfaces 22' and 24' of the bottom members 22 and 24, respectively. This provides maximum protection for the back side of the communication equipment when mounted to the rack 10. A plurality of holes 60, 61, 62 and 63 are made in the brattice 58 for insertion of threaded fasteners into the square fasteners 50 lying beneath the brattice 58 for securing the communication node 14. This allows the node 14 to be mounted to the rack members and in front of the brattice 58. In addition, once the power supply is attached to the rack, the lower portion of the brattice 28 is retained between the power supply and the rack members. Also, by extending the brattice 58 beneath the plate 28 from the bottom surface 28" and in front of the mounting portion 52, any water that may drip from the back edge of the plate 28 will flow down the back of the brattice 28 and away from the communication equipment.

Figures 5A, 5B:
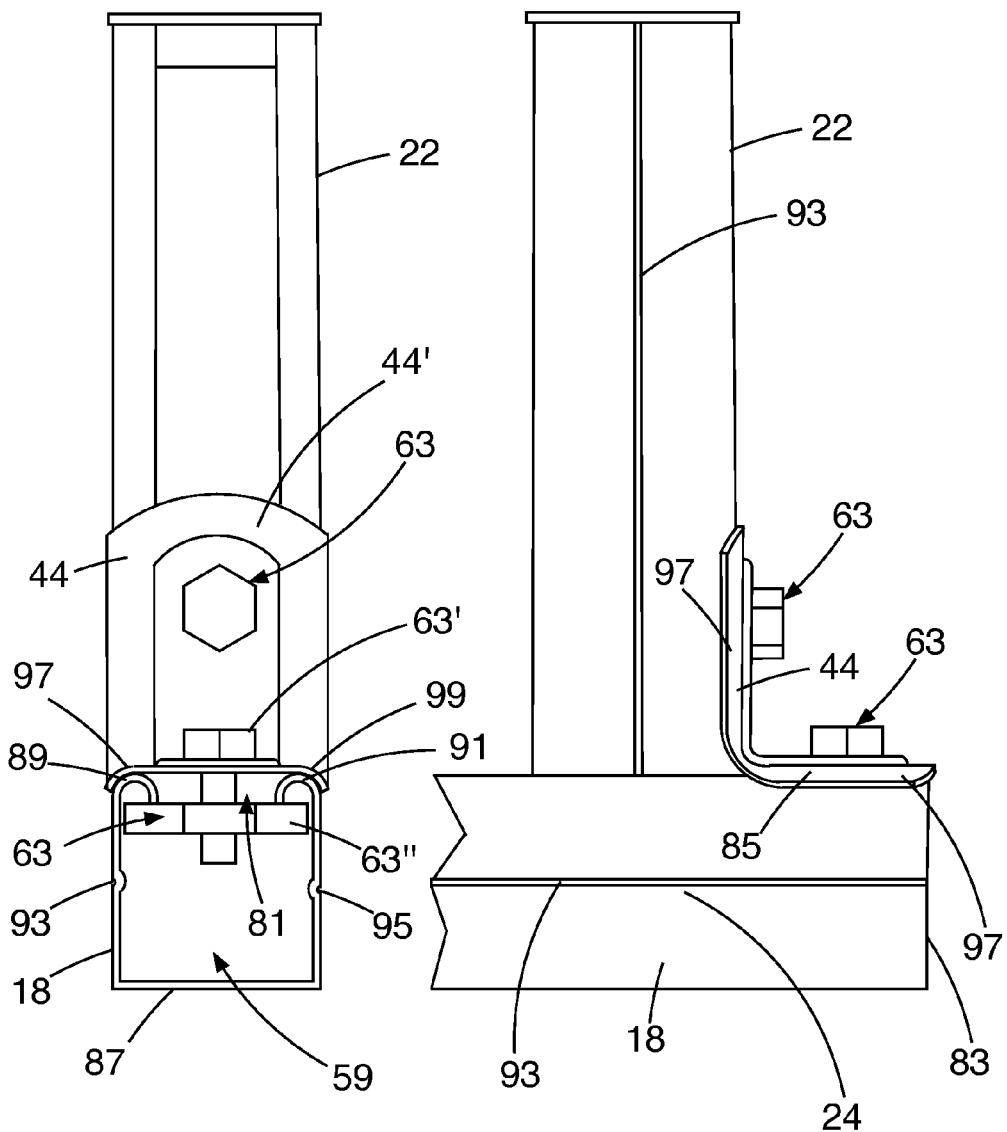
FIGS. 5A and 5B are partial bottom and side views of a portion of the communications equipment mounting rack in accordance with the principles of the present invention.

FIGS. 5A and 5B illustrate distal end and side views of the attachment of one of the support members 22 to one of the rack members 18. As shown, the rack member 18 has a C-shaped cross section defining a longitudinally extending channel with elongate opening 81 for receiving fastener system 63 that includes a bolt portion 63' and nut portion 63". A similar fastener system 63 is provided proximate the opposite end of the L-shaped bracket 44 for retaining the end 44' to the support member 22. Because the elongate opening 81 extends the entire length of the rack member 18, the fastener 63 can be slid into the channel 59 to retain the L-shaped bracket 44 thereto. The support member 22 is positioned a distance from the distal end 83 of the rack member 18 to accommodate the portion 85 of the L-shaped bracket 44 secured to the rack member 18. The support member 22 is held by the L-shaped bracket 44 at approximately 90 degrees or perpendicularly to the rack member 18.

The rack member 18 and support member 22 are formed from elongate members having generally C-shaped cross-sections as illustrated with a substantially square back side portion 87 and rounded front portions 89 and 91 that define the longitudinally extending slot or opening 81. The rounded nature of the portions 89 and 91 provide structural strength to the portions 89 and 91 while allowing some compressive force between the bolt 63' and nut 63" so as to provide a bias between the bolt 63' and the nut 63". This bias prevents the nut 63" from becoming loose relative to the bolt 63" when installed, similar to the effect of a lock washer without the need for use of such a lock washer. Longitudinally extending side channels 93 and 95 formed in the side walls of the rack members 18 and 22 provide lateral rigidity to the rack members 18 and 22 so as to add lateral strength to each member 18 and 22. The L-shaped bracket 44 has longitudinally curved sides 97 and 99 to wrap at least partially over the adjacent rounded portions 89 and 91 in order to at least partially match a contour thereof. The curved sides 97 and 99 cause the L-shaped bracket 44 to self align relative to a respective member 18 and 22 so as to align the members 18 and 22 in a perpendicular arrangement, both laterally and longitudinally and to prevent twisting of the support member 22 relative to the rack member 18 when assembling the two.

Figure 6:
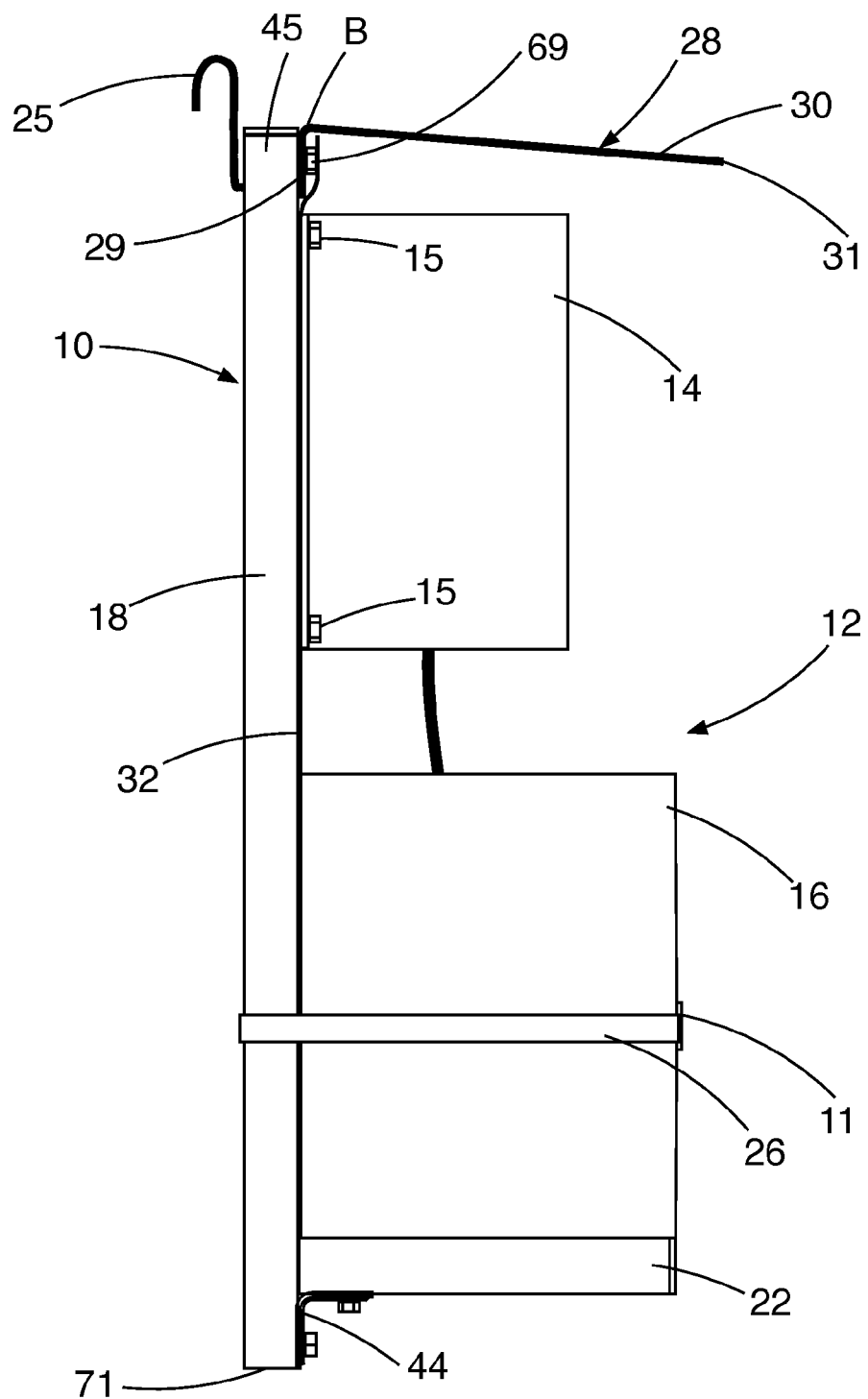
FIG. 6 is a side view of a communications equipment mounting rack and associated communications equipment in accordance with the principles of the present invention.

Referring now to FIG. 6, there is illustrated the rack system, generally indicated at 10 in accordance with the principles of the present invention. The communications equipment, generally indicated at 12 is secured to and fully supported the rack system 10. The rack system 10 and associated communications equipment 12 is configured to be hung, as with wire hook 25 to other mining equipment or support structure present within an underground mine in order to keep the communications equipment away from areas within the mine where the communications equipment may get wet or damaged from falling debris. As previously discussed herein, the communications equipment is comprised of at least a communications node 14 and a power supply 16 in the form of a battery pack housed within a case. The rack system is comprised of a pair of vertically oriented and spaced apart rack members (only rack member 18 of which is visible in this view), a pair of horizontally extending support members, only support member 22 of which is visible, each coupled to a respective rack member 18 near a distal end 71 thereof with an L-shaped bracket 44. The support member 22 and L-shaped bracket 44 are provided to support the weight of power supply 16 relative to the rack member 18. A selectively removable strap 26 is wrapped around the power supply 16 and the rack members 18 (and rack member 20 shown in FIG. 1) to temporarily secure the power supply 16 to the rack system 10 of the present invention. A retention and release buckle 11 secures the strap 26 around the power supply 16 and can be released to allow the power supply to be removed from the rack system 10 for repair or replacement without having to disassemble any part of the rack system 10.

A cantilevered overhanging plate 28 is attached to the proximal end 45 of the rack member 18. The plate 28 has an L-shaped cross section with a back wall portion 29 secured as with fasteners 69 extending through the back wall portion 29 and into an internally threaded fastener 50 (not visible) disposed within the rack member 18. Outwardly depending from the back wall portion 29 is an overhang portion 30 that is cantilevered relative to the back wall portion 29 and that extends over the communications equipment 12. The overhang portion 30 has a width that is wider than the communications node 14 and at least as wide as the power supply 16. The overhang portion 30 has a back to front length from the back wall portion 29 to the front edge that is longer than the back to front length of the communications node 14 and at least as long as the back to front length of the power supply 16. The overhang portion 30 is slightly downwardly angled at an acute angle relative to the back wall portion 29 at an angle of between about 89 degree and 45 degrees to cause any water that may drip onto the overhang portion to flow to the front edge 31 and drip away from the communications equipment so as to not run under the overhang portion and onto the communication equipment 12. It may be more desirable to downwardly angle the overhang portion at an acute angle relative to the back wall portion 29 at an angle of between about 85 degrees and 60 degrees, while a better angle may be between about 75 and 70 degrees. It is also contemplated that the angle may be between about 85 and 50 degrees or 80 and 55 degrees. Likewise, any debris that may fall onto the overhang portion 30 will be deflected away from the communications equipment 12.

Coupled between the rack member 18 and the communications equipment 12 is a flexible sheet 32 of material that is waterproof, dustproof and fire resistant. The flexible sheet 32 extends from a location proximate the interface or bend B between the back wall portion 29 and the overhang portion 30 of the plate 28 on a front facing side thereof to overlap a substantial portion of the front facing side and fasteners 69, behind the communications node 14 and power supply 16 and has a width that extends at least as wide as the communications node 14, but may be as wide as the width of the plate 30 so as to provide water and dust protection to the rear of the communications equipment 12. Also, by extending the upper edge of the flexible sheet to a front side of the back wall portion 29 above a lower edge thereof any water that flows behind the back wall of the plate 28 will continue to flow behind the flexible sheet and be prevented from contacting the communications equipment 12. This is also accommodated by forming the back wall 29 and the overhang portion 30 from a continuous sheet of material, such as steel, aluminum or other suitable metal plating that can be bent to form the back wall portion 29 from such a plate 28 with bend B interposed there between so as to form a water and dust impervious interface between the two portions 29 and 30. The flexible sheet 32 is held between the communications equipment 12 and the rack 18 by the fasteners 15 that secure the communications node 14 to the rack member 18 and by the back of the power supply 16 abutting against the flexible sheet 32 and holding the flexible sheet 32 between the power supply 16 and the rack member 18.

Accordingly, the present invention provides a relatively lightweight rack system for securing a communications equipment set within an underground mine. As such, the rack system and attached communications equipment, while protecting the communications equipment while in place, can be easily relocated during mining operations as is often the case as the underground mine is expanded. Moreover, by having the communications equipment preinstalled to the rack system, the entire rack system with communications equipment can be easily carried into the mine for placement. Moreover, because the communications equipment is protected while not being placed in an enclosed cabinet for example, access to the communications equipment is not hampered to make cable connections, replace the power supply, repair components of the communications equipment or perform other tasks that may be required on the communications equipment. Thus, the rack system of the present invention ensures that both the communications node and the power supply are protected from water and debris that may originate above the rack system without interfering with the operation and use of the communications equipment, all while keeping the power supply secured relative to the communications node.

While there have been described various embodiments of the present invention, those skilled in the art will recognize that other and further changes and modifications may be made thereto without department from the spirit of the invention, and it is intended to claim all such changes and modifications that fall within the true scope of the invention. In the foregoing specification, the present invention has been described with reference to specific exemplary embodiments. Various modifications and changes may be made, however, without departing from the spirit and scope of the present invention as set forth in the claims, including without limitation combinations of various features of the various illustrated embodiments. For example, the components and/or elements recited in any apparatus claims may be assembled or otherwise operationally configured in a variety of permutations and are accordingly not limited to the specific configuration recited in the claims. Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims. The specification and figures are thus illustrative, not restrictive, and modifications and combinations are intended to be included within the scope of the present invention. Accordingly, the scope of the present invention should be determined by the claims and their legal equivalents rather than by the examples described.

It is also understood that, as used herein and in the appended claims, the singular forms "a," "an," and "the" include plural reference, unless the context clearly dictates otherwise. The terms "comprise", "comprises", "comprising", "having", "including", "includes" or any variations of such terms, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Unless defined otherwise, all technical and scientific terms used herein have the same meanings as commonly understood by one of ordinary skill in the art to which this invention belongs. While various methods and structures of the present invention are described herein, any methods or structures similar or equivalent to those described herein may by used in the practice or testing of the present invention. All references cited herein are incorporated by reference in their entirety and for all purposes. In addition, while the foregoing advantages of the present invention are manifested in the illustrated embodiments of the invention, a variety of changes can be made to the configuration, design and construction of the invention to achieve those advantages including combinations of components of the various embodiments. Hence, reference herein to specific details of the structure and function of the present invention is by way of example only and not by way of limitation.

What is claimed is:

1. A method of mounting communications equipment in an underground mine in a manner that protects the communications equipment from damage, comprising:

provided a communications system rack comprising:

a pair of vertical rack members that are laterally spaced and substantially parallel to one another;

a pair of horizontally extending support members, each depending and outwardly extending proximate a lower end of a respective rack member a distance approximately equal to a thickness of a power supply;

an upper shield member attached to and extending outwardly from proximate an upper end of the pair of rack members in the same direction as the pair of support members, extending a distance at least equal to a depth of a power supply and having a width at least equal to a width of the power supply; and a flexible sheet of material disposed over the pair of rack members from below the upper shield to above the pair of support members, the flexible sheet of material having a width that is approximately equal to a width of the power supply;

fixedly attaching a communications node to the pair of rack members with the flexible sheet of material disposed therein between to secure the communications node to the pair of rack members and the flexible sheet of material between the communications node and the pair of rack members;

removably attaching the power supply to the pair of rack members and resting the power supply on the pair of support members; and electronically connecting the power supply to the communications node.

2. The method of claim 1, further comprising hanging the communications system rack in an underground mine with the upper shield member positioned above the communications node and the power supply.

3. The method of claim 2, further comprising providing the pair of rack members with a C-shaped cross section and further comprising providing a plurality of substantially square fasteners inserted within said elongate members and a corresponding plurality of externally threaded fasteners each inserted through a portion of said communication node, through said flexible sheet of material and into a respective one of said plurality of square fasteners.

4. The method of claim 3, further comprising providing a pair of L-shaped brackets rigidly fastened to and between the respective lower ends of the elongate members and a respective one of the horizontally extending members to rigidly secure the pair of horizontally extending members in a substantially perpendicular arrangement relative to the pair of vertically extending members.

5. The method of claim 4, further comprising providing the upper shield member with an L-shaped cross section with a back wall portion fixedly attached to and between the pair of horizontally extending members and an overhang portion integrally formed with and depending from said back wall portion.

6. The method of claim 5, further comprising providing the upper shield member with a width that is greater than a width of the communication node and a front to back length that is greater than a front to back length of the communication node.

7. The method of claim 6, further comprising providing the upper shield member from a substantially rectangular sheet of metal having a bend proximate one end thereof to form the back wall portion, where an acute angle is formed between the back wall portion and the overhang portion.

8. The method of claim 7, further comprising attaching the flexible sheet of material so that a portion thereof is disposed over the back wall portion in an overlapping manner to prevent water from passing in front of the flexible sheet of material from the back wall portion.

9. The method of claim 8, further comprising forming the flexible sheet of material from MSHA approved brattice.

\* \* \* \* \*